US008355455B2

(12) United States Patent
Mansour et al.

(10) Patent No.: US 8,355,455 B2
(45) Date of Patent: Jan. 15, 2013

(54) USING CHANNEL ESTIMATES ASSOCIATED WITH OFDM PILOT SYMBOLS TO ESTIMATE ADDITIONAL PARAMETERS

(75) Inventors: Mohammad M. Mansour, San Jose, CA (US); Sundeep Rangan, Jersey City, NJ (US); Siddharth Ray, Bridgewater, NJ (US); Vincent Loncke, Piscataway, NJ (US); Pramod K. A. Rao, Edison, NJ (US); Joshua L. Koslov, Hopewell, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 932 days.

(21) Appl. No.: 12/431,246

(22) Filed: Apr. 28, 2009

(65) Prior Publication Data
US 2010/0272196 A1 Oct. 28, 2010

(51) Int. Cl.
*H04L 27/28* (2006.01)
(52) U.S. Cl. ........ 375/260; 375/340; 375/343; 375/371; 375/362; 375/316; 375/344; 375/355; 370/344; 370/203; 455/59; 455/60
(58) Field of Classification Search .................. 375/260, 375/340, 343, 371, 362, 316, 344, 355; 370/344; 370/203; 455/59, 60
See application file for complete search history.

(56) References Cited

U.S. PATENT DOCUMENTS

| 5,852,630 | A   | * | 12/1998 | Langberg et al. ............. 375/219 |
|-----------|-----|---|---------|--------------------------------------|
| 7,139,320 | B1  |   | 11/2006 | Singh et al.                         |
| 7,697,622 | B2  | * | 4/2010  | Han et al. ....................... 375/260 |
| 2003/0026371 | A1 | * | 2/2003 | Laroia et al. .................. 375/362 |
| 2004/0161047 | A1 | * | 8/2004 | Liu et al. ...................... 375/260 |
| 2005/0281290 | A1 |   | 12/2005 | Khandekar et al.                     |
| 2006/0176802 | A1 | * | 8/2006 | Ko et al. ....................... 370/208 |
| 2006/0209732 | A1 | * | 9/2006 | Gorokhov et al. ............ 370/310 |
| 2007/0110175 | A1 |   | 5/2007  | Fechtel                              |
| 2008/0165908 | A1 |   | 7/2008  | Vrcelj et al.                        |
| 2008/0232484 | A1 |   | 9/2008  | Budianu et al.                       |
| 2008/0240308 | A1 | * | 10/2008 | Lee et al. ...................... 375/343 |
| 2010/0027698 | A1 | * | 2/2010  | Kim et al. ..................... 375/260 |

FOREIGN PATENT DOCUMENTS

WO WO2007051190 5/2007

OTHER PUBLICATIONS

P.H. Moose, "A Technique for Orthogonal Frequency Division Multiplexing Frequency Offset Correction", IEEE Transactions on Communications, vol. 42, No. 10, pp. 2908-2914, 1994.

* cited by examiner

*Primary Examiner* — Siu Lee
(74) *Attorney, Agent, or Firm* — Stanton Braden (57) ABSTRACT

Channel estimates respectively associated with OFDM pilot symbols are used to estimate additional parameters such as change in channel phase over time, change in channel phase over frequency, and frequency selectivity.

20 Claims, 13 Drawing Sheets

USING CHANNEL ESTIMATES ASSOCIATED WITH OFDM PILOT SYMBOLS TO ESTIMATE ADDITIONAL PARAMETERS

BACKGROUND

1. Field

The present work relates generally to wireless communication and, more particularly, to OFDM (Orthogonal Frequency Division Multiplexed) wireless communication.

2. Background

Figure 1:
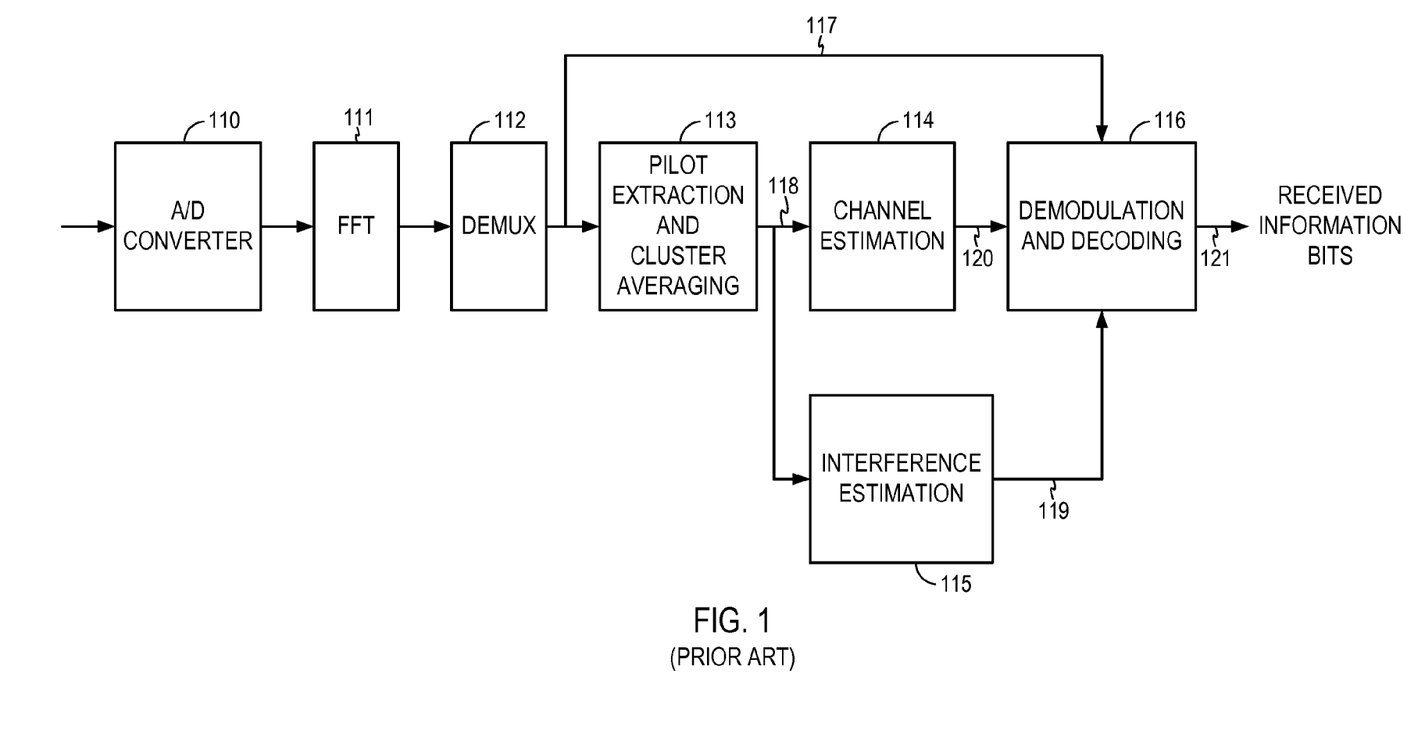
FIG. 1 diagrammatically illustrates an OFDM receiver according to the prior art.

FIG. 1 diagrammatically illustrates an OFDM receiver according to the prior art. After down-conversion to baseband, the signal is converted from analog to digital in the A/D converter 110, and processed by an FFT unit 111 to provide the values of the subcarriers for each OFDM symbol. A demultiplexer ("demux") unit 112 then aggregates the modulation symbols. A pilot extraction unit 113 extracts pilots (or clusters of pilots) from the received modulation symbols (which also include data symbols).

Figure 2:
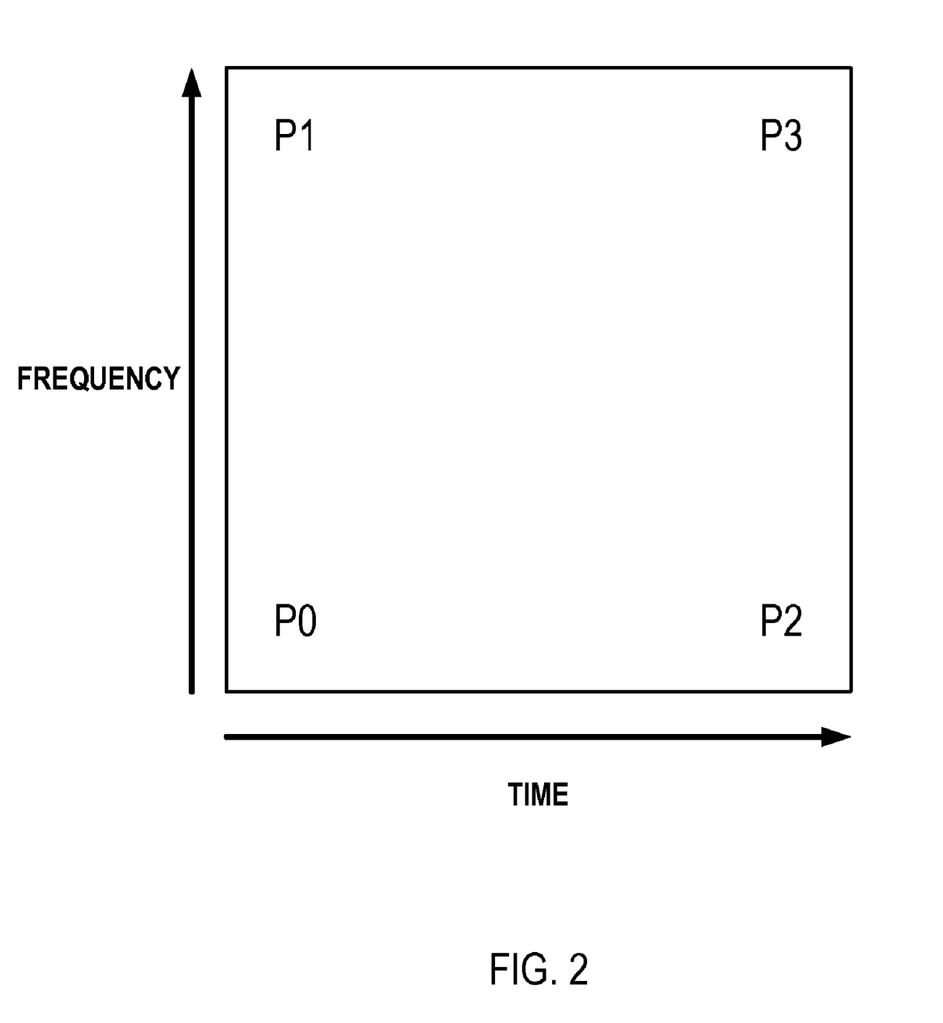
FIG. 2 diagrammatically illustrates an example of an OFDM tile that may be used by exemplary embodiments of the present work.

At 114, a channel estimation unit derives a channel estimate from the pilots (or from averages of pilot clusters). One known method is to consider a region in time and frequency (also referred to as a tile) that contains four pilots (or pilot clusters), one for each of the following points in the region: (1) lowest frequency at earliest time; (2) highest frequency at earliest time; (3) lowest frequency at latest time; and (4) highest frequency at latest time. The pilot extraction unit 113 makes local complex channel estimates corresponding to each of these four time/frequency extremes. These four local complex channel estimates are provided at 118. (FIG. 2 shows an example of four local channel estimates P0-P3 associated with the four time/frequency extremes of a given tile.) The channel estimator 114 characterizes the local channel estimates at 118 as each having a first component that is constant, a second component that varies linearly with frequency, and a third component that varies linearly with time. By superposing these three components, a channel estimate for any time/frequency position within the region is obtained at 120.

In addition, an interference estimate 119 is obtained by interference estimator 115, which estimates a fourth component that is orthogonal to the aforementioned constant, linear in time and linear in frequency components. Demodulation/decoding unit 116 uses the channel estimate 120, the interference estimate 119 and the data symbols (provided at 117 by demux unit 112) to demodulate the signal into, e.g., log-likelihood ratios (LLRs). The unit 116 then decodes the demodulation result using a forward-error-correction (FEC) decoder, such as a Viterbi or turbo decoder, to produce at 121 a received version of the transmitted payload.

Exemplary embodiments of the present work provide heretofore unrecognized applications for the aforementioned local channel estimates produced at 118 by the pilot extraction unit 113.

SUMMARY

According to exemplary embodiments of the present work, additional estimates are derived from the aforementioned local channel estimates. Examples of such additional estimates include estimates of parameters such as the change in channel phase over time, the change in channel phase over frequency, and frequency selectivity.

BRIEF DESCRIPTION OF THE DRAWINGS

Various aspects of a wireless communications system are illustrated by way of example, and not by way of limitation, in the accompanying drawings, wherein.

DETAILED DESCRIPTION

The detailed description set forth below in connection with the appended drawings is intended as a description of various embodiments of the present work and is not intended to represent the only embodiments in which the present work may be practiced. The detailed description includes specific details for the purpose of providing a thorough understanding of the present work. However, it will be apparent to those skilled in the art that the present work may be practiced without these specific details. In some instances, well known structures and components are shown in block diagram form in order to avoid obscuring the concepts of the present work.

The word "exemplary" is used herein to mean "serving as an example, instance, or illustration." Any embodiment described herein as "exemplary" is not necessarily to be construed as preferred or advantageous over other embodiments.

According to exemplary embodiments of the present work, additional estimates are derived from the aforementioned local channel estimates. Examples of such additional estimates include estimates of parameters such as the change in channel phase over time, the change in channel phase over frequency, and frequency selectivity. The estimates of the changes in channel phase over time and frequency may be produced on a per tile basis, and fed to, e.g., digital phase-locked loops (DPLLs) for integration over many tiles in order to estimate overall time and frequency offsets for the communications link (e.g., a specific mobile to base station link). These overall time and frequency offset estimates are compensated for in a feedback manner by imposing opposite offsets to those estimated. The frequency selectivity (variability) estimate is used to determine an appropriate pilot format for the link. That is, for channels that exhibit high frequency variability or selectivity (which indicates a large channel delay spread), a pilot format with more frequency samples may be desirable.

In order to make an estimate of the frequency offset in the receiver, some embodiments use a measure of the phase change, over a given tile, from the earliest complex channel estimates to the latest complex channel estimates. Similarly, in order to make an estimate of the time offset in the receiver, some embodiments use a measure of the phase change, over the tile, from the lowest frequency complex channel estimates to the highest frequency complex channel estimates.

With reference to FIG. 2, for frequency offset estimation, the two complex channel estimates, P2 and P3 (provided at 118 in FIG. 1), at the latest time are averaged together to produce an average P23. Similarly, the two complex channel estimates, P0 and P1 (provided at 118 in FIG. 1), at the earliest time are averaged together to determine an average P01. A linear interpolation may be made between P01 and P23 to determine the values at intermediate points. Some embodiments estimate the phase difference between P01 and P23.

For example, a simple phase difference estimate may be obtained by taking $$\text{diffEst} = \text{imag}(P23 \times P01^*), \quad (1)$$

where P01* is the complex conjugate of P01.
This can also be written as $$\text{diffEst} = |P23| \times |P01| \times \sin(\text{angle}(P23) - \text{angle}(P01)), \quad (2)$$

which for small angles is approximately $$\text{diffEst} = |P23| \times |P01| \times (\text{angle}(P23) - \text{angle}(P01)). \quad (3)$$

This diffEst is used, e.g., in a digital phase-locked loop (DPLL) to gradually correct the frequency error, so that the average of diffEst will gradually tend towards zero.

Figure 3:
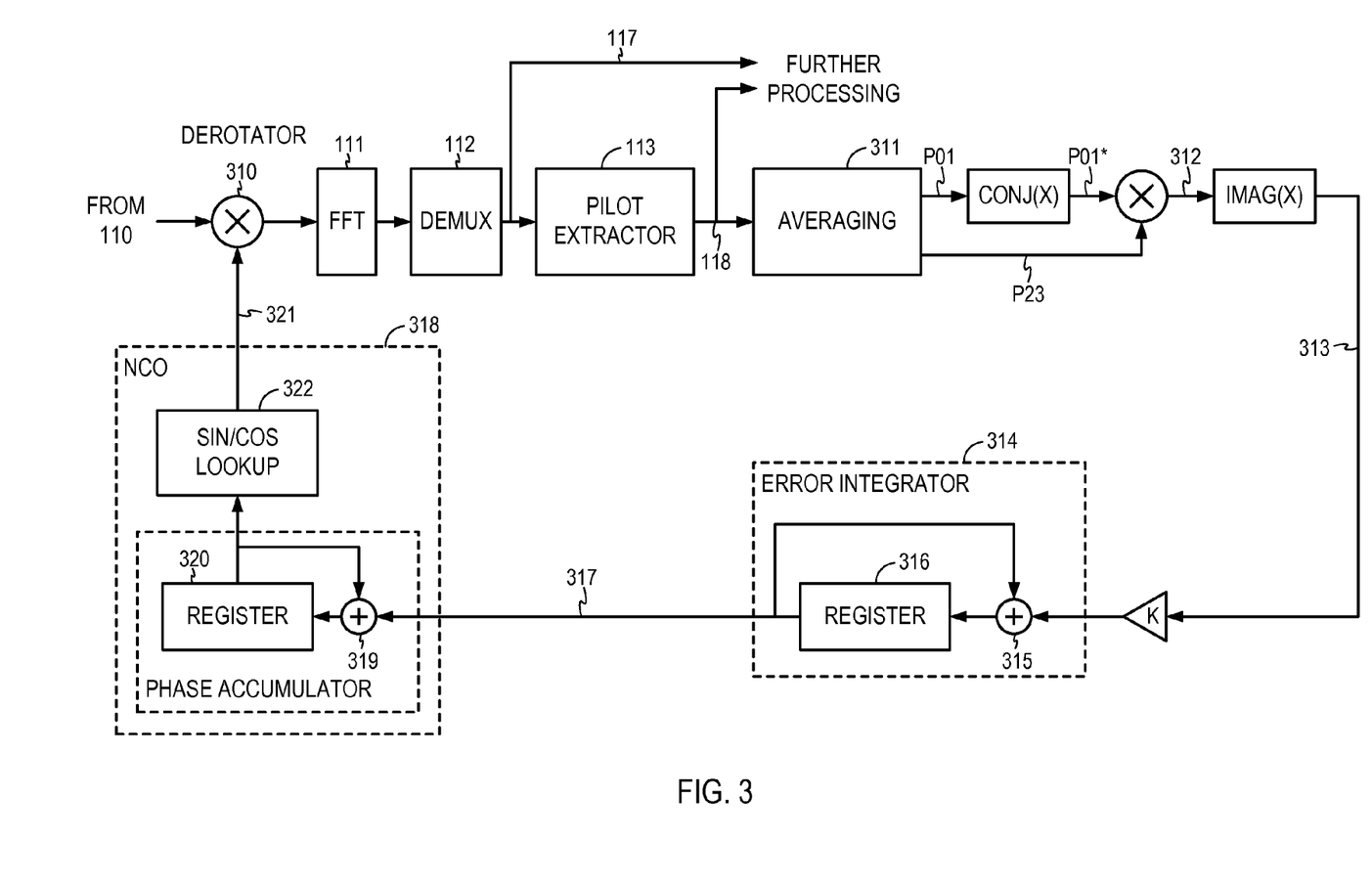
FIG. 3 diagrammatically illustrates an OFDM receiver that performs frequency offset correction according to exemplary embodiments of the present work.

FIG. 3 diagrammatically illustrates an OFDM receiver that performs frequency offset correction according to exemplary embodiments of the present work. In the receiver of FIG. 3, the OFDM symbol received from the output of A/D converter 110 (see also FIG. 1) is first derotated by a derotator (e.g., a mixer) 310 according to a current estimate of the frequency offset. The derotated signal is processed successively by an FFT unit 111 and a demux unit 112 as in FIG. 1. At 113, the pilot modulation symbols are extracted from the modulation symbols, and the corresponding complex channel estimates P0-P3 are produced at 118. In some embodiments that use clusters of pilots instead of individual pilots, the clusters are processed in conventional fashion to produce one complex channel estimate per cluster. Next, at 311, the channel estimates P0-P3 at 118 are averaged into an early average, P01, of the channel estimates associated with the first OFDM symbols of the tile, e.g. P0 and P1 of FIG. 2, and a late average, P23, of the channel estimates associated with the last OFDM symbols of the tile, e.g. P2 and P3 of FIG. 2.

A phase difference between the early average P01 and the late average P23 is estimated by multiplying the late average P23 by the complex conjugate, P01*, of the early average P01, and then extracting the imaginary component of the multiplication result 312. The extracted imaginary component 313 provides an approximation of the phase difference, due to frequency offset, between the time corresponding to the late average P23 and the time corresponding to the early average P01. As tiles are received, possibly at random times, from a given user, the phase difference estimates derived at 313 are scaled and integrated in an error integrator (also referred to herein as a loop filter) 314 that includes an adder 315 and a register 316. The output 317 of the error integrator 314 is a free-running estimate of the frequency offset between the transmitter and receiver. It is used as in input to a numerically-controlled oscillator (NCO) 318 which controls the derotator 310 to derotate the incoming signal. The NCO 318 comprises a phase accumulator (which includes a register 320 and an adder 319), and a sine/cosine lookup table 322 that produces complex sinusoid values 321 in response to phase values produced by the phase accumulator.

Figure 4:
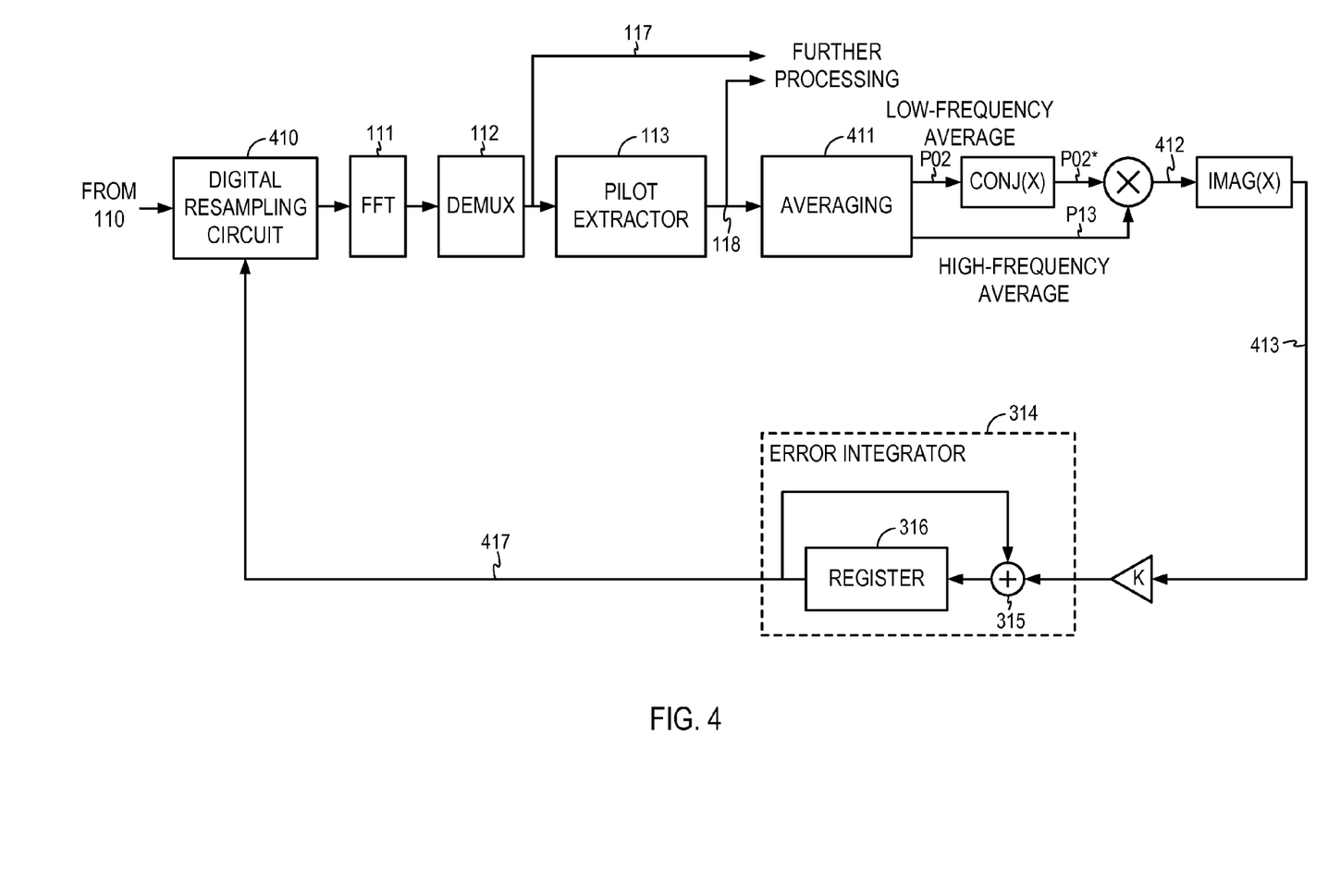
FIG. 4 diagrammatically illustrates an OFDM receiver that performs timing offset correction according to exemplary embodiments of the present work.

In similar fashion, phase differences between the channel estimates at the highest and lowest frequencies of the tile may be used to drive a DPLL to correct a time offset. FIG. 4 diagrammatically illustrates an OFDM receiver that performs timing offset correction according to exemplary embodiments of the present work. In FIG. 4, the received OFDM symbol from A/D converter 110 (see also FIG. 1) is first shifted in time by a digital resampling circuit 410 according to a current estimate of the timing offset. Then, the signal is processed successively by an FFT unit 111 and a demux unit 112 to convert the input time-domain signal into frequency-domain subcarrier values. Complex channel estimates P0-P3 produced at 118 by pilot extractor 113 are averaged at 411 to produce a low-frequency average P02 of the lowest frequency channel estimates P0 and P2 (see also FIG. 2), and a high-frequency average P13 of the highest-frequency channel estimates P1 and P3.

A phase difference between the low-frequency average P02 and the high-frequency average P13 is produced by multiplying the high-frequency average P13 by the complex conjugate P02* of the low-frequency average P02, and then extracting the imaginary component of the multiplication result 412. The extracted imaginary component 413 provides an approximation of the phase difference, due to timing offset, between the frequency corresponding to the high-frequency average P13 and the frequency corresponding to the low-frequency average P02. As tiles are received, possibly at random times, from a given user, the phase estimates derived at 413 are scaled and integrated in an error integrator 314, comprising an adder 315 and a register 316. The output 417 of the error integrator 314 is a free-running estimate of the timing offset between the transmitter and receiver. This estimate 417 is input to the digital resampling circuit 410 to control the time shifting operation.

Figure 5:
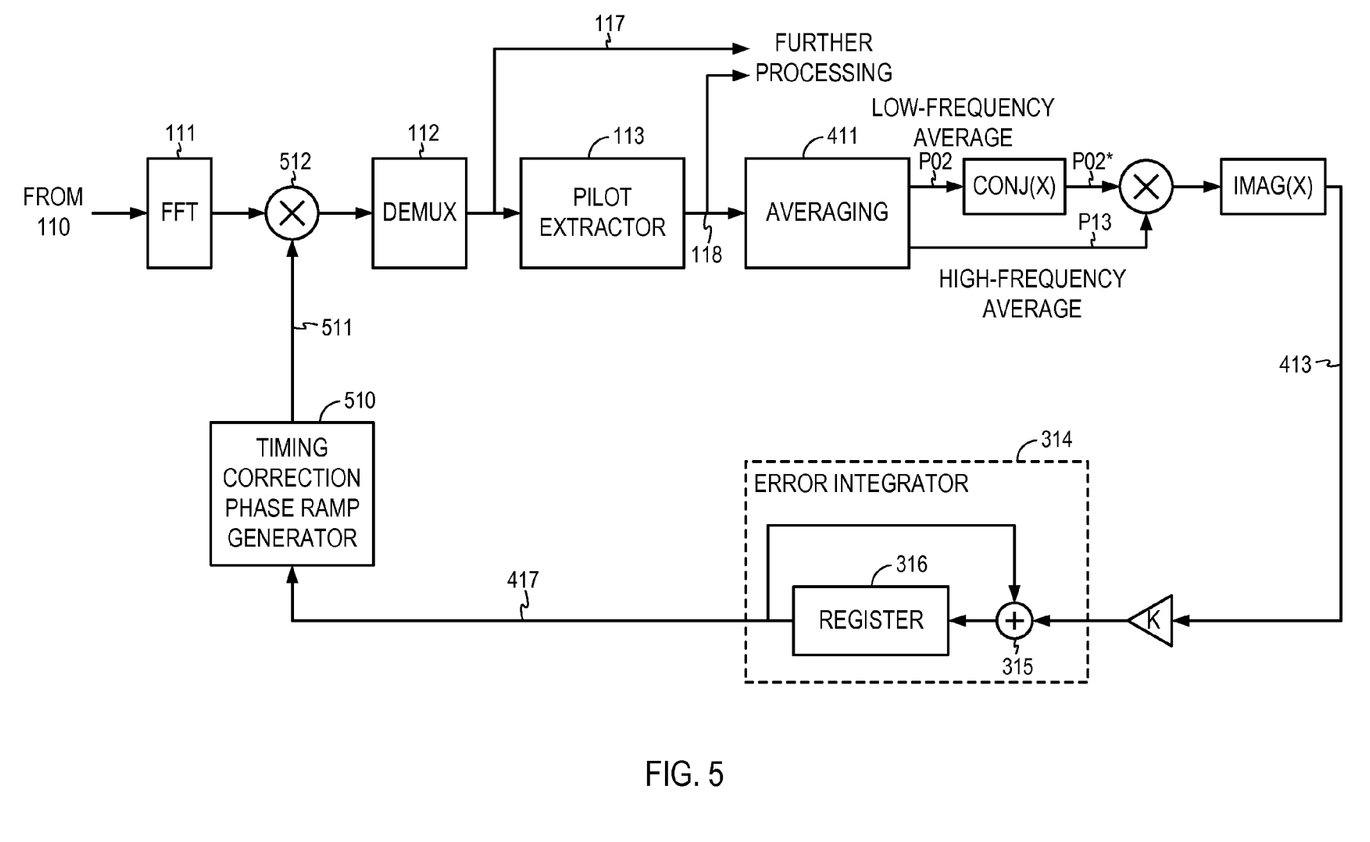
FIG. 5 diagrammatically illustrates an OFDM receiver that performs timing offset correction according to further exemplary embodiments of the present work.

FIG. 5 diagrammatically illustrates an OFDM receiver that performs timing offset correction according to further exemplary embodiments of the present work. The receiver of FIG. 5 is generally similar to the receiver of FIG. 4, except the output 417 of the error integrator 314 is input to a phase ramp generator 510. In response to the free-running timing offset estimate at 417, the phase ramp generator 510 applies a phase ramp signal 511 to a mixer 512 whose other input receives the output of the FFT unit 111, and whose output is applied to the demux unit 112. The application of the phase ramp signal 511 across frequency corresponds to a time shift in the time domain.

Although, in a fading channel, the amplitude may randomly be similar at multiple frequencies, if there is multipath present, at some point, if the delay spread is large enough, there will be a large difference between adjacent frequency channel estimate magnitudes. In some embodiments, estimates are taken over several time/frequency regions, so that several points in frequency are obtained. A metric of the variation over frequency is then determined, for example, the highest magnitude divided by the lowest magnitude over all frequencies.

Figure 6:
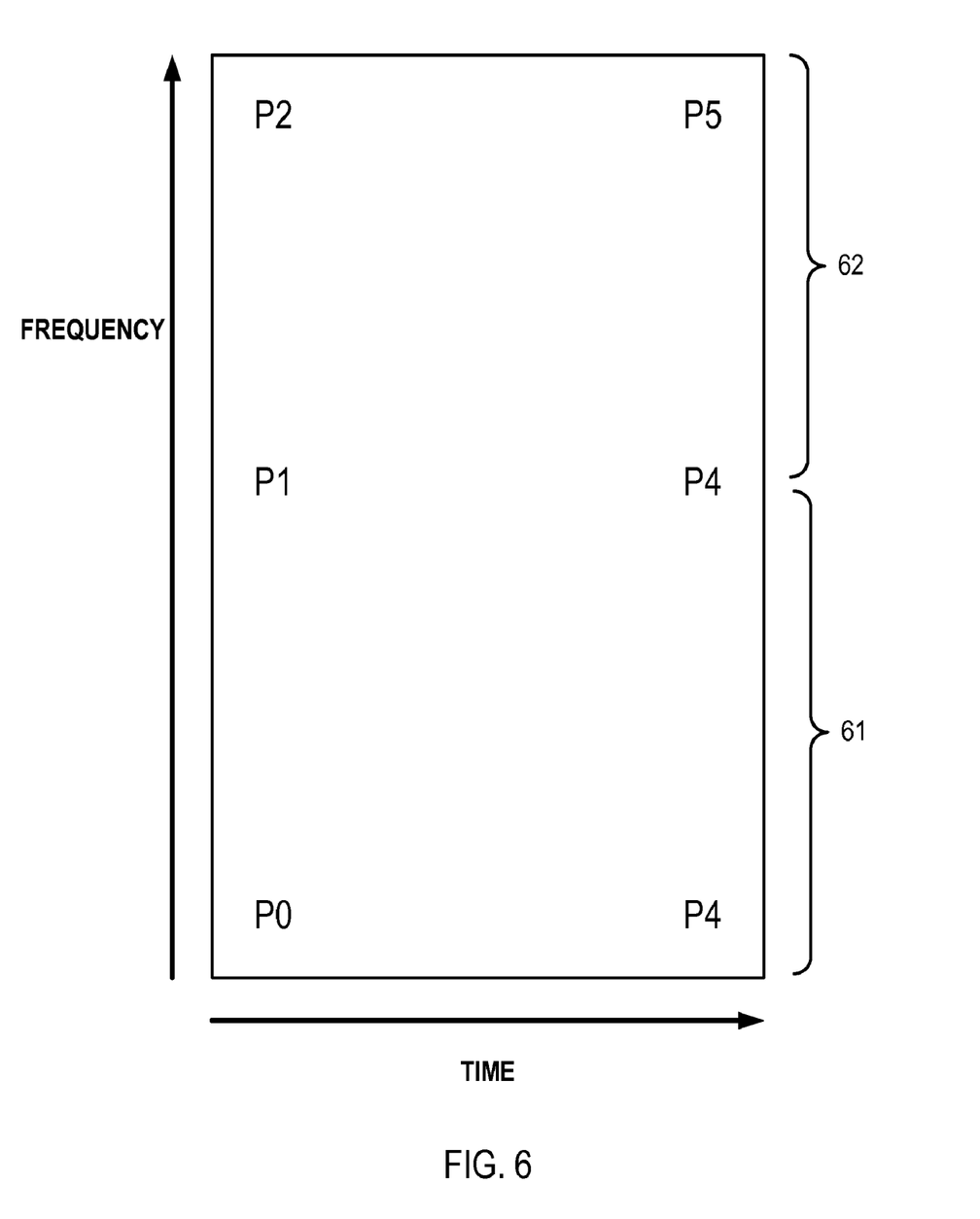
FIG. 6 illustrates two OFDM tiles adjacent in frequency, as used by exemplary embodiments of the present work to estimate frequency selectivity.

FIG. 6 illustrates six time/frequency points and corresponding channel estimates P0-P5. These six points are positioned within two time frequency/regions 61 and 62 that are adjacent in frequency. Various embodiments estimate the frequency selectivity of the channel over the combined regions 61 and 62 in various ways. In one implementation, the amplitude squared of the complex channel estimate at each of the six points is calculated to obtain amplitude squared values A0, . . . A5 from the respectively corresponding channel estimates P0, . . . P5. Then, a measure of the selectivity is obtained as the minimum normalized fade. More specifically, the average amplitude squared value is obtained as $$A_{AVG} = \frac{1}{N} \sum_{i=0, N-1} A_i, \quad (4)$$

and a minimum (that is, deepest) normalized fade is obtained as $$F_{DEEP} = \min(A_0, A_1 \ldots A_{N-1})/A_{AVG}. \quad (5)$$

If the deepest fade falls below a predetermined threshold, then it may be deemed that the channel is exhibiting frequency variation or selectivity. In some embodiments, the calculation of $F_{DEEP}$ is done over a single OFDM symbol, e.g. on A0, A1, A2 corresponding to P0, P1, P2. (This would correspond to N=3 in equations 4 and 5). In some embodiments, the calculation is done by first averaging in time to work with averages A03, A14, A25 which are, respectively, the averages of A0 and A3; A1 and A4; and A2 and A5. A frequency selectivity estimator 1600 according to exemplary embodiments of the present work is illustrated diagrammatically in FIG. 16. The estimator 1600 includes an amplitude squaring unit 1601, an averaging-and-minimum-selection unit 1602, and a divider 1603. These portions of the estimator 1600 cooperate to implement equations 4 and 5.

Figure 16:
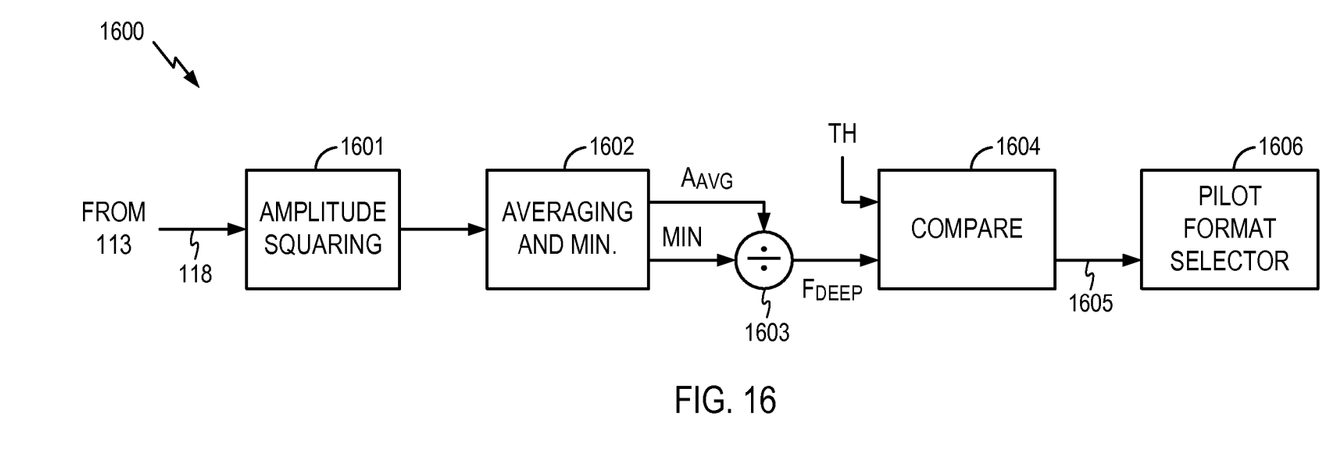
FIG. 16 diagrammatically illustrates a frequency selectivity estimator according to exemplary embodiments of the present work.

The output of the divider 1603 is $F_{DEEP}$, which is compared at 1604 to a threshold value TH. If $F_{DEEP}$ falls below the threshold TH, this indicates that more frequency samples are warranted for the channel estimate. That is, this information may be used to switch between different pilot formats containing respectively different pilot frequency spacings, if available. For example, if it is deemed that the channel exhibits enough selectivity, i.e., $F_{DEEP}<TH$, then an upper layer may request a signal format containing more pilots per frequency.

Conversely, if it is deemed that the channel exhibits little selectivity (e.g., $F_{DEEP} \gg TH$), corresponding to a small channel delay spread, then an upper layer may request a signal format containing fewer pilots per frequency be sent. The compare result at 1605 is thus provided to an upper layer pilot format selector 1606, which selects the pilot format based on the compare result 1605.

In some embodiments, an interference estimation unit performs interference estimation by extracting interference estimates in each time/frequency region, and estimating the average interference level and/or interference statistics. An exemplary embodiment is shown at 1700 in FIG. 17. The interference estimate 119 produced by the interference estimator 115 (see also FIG. 1) is processed further at 1701 to determine average interference, and/or interference statistics at 1702. The information produced at 1702 is provided to an upper layer for use in a control application, for example, a scheduler 1703. The upper layer scheduler 1703 may use the information 1702 to assist in avoidance of frequency sub-bands containing high interference levels.

Figure 17:
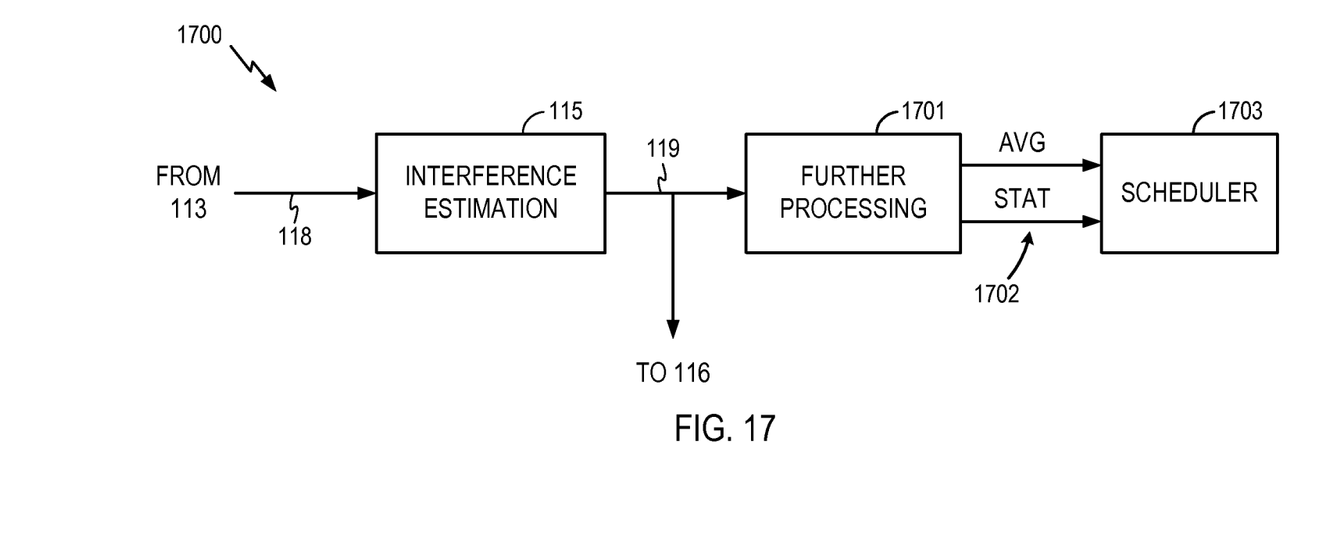
FIG. 17 diagrammatically illustrates an interference estimation unit according to exemplary embodiments of the present work.

In some embodiments, the frequency ranges of the tiles are known to the further processor 1701. This permits the further processor 1701 to provide the information 1702 on a sub-band basis, where a sub-band is a range of frequencies that is smaller than the entire band being processed, and may contain multiple tiles.

Figure 7:
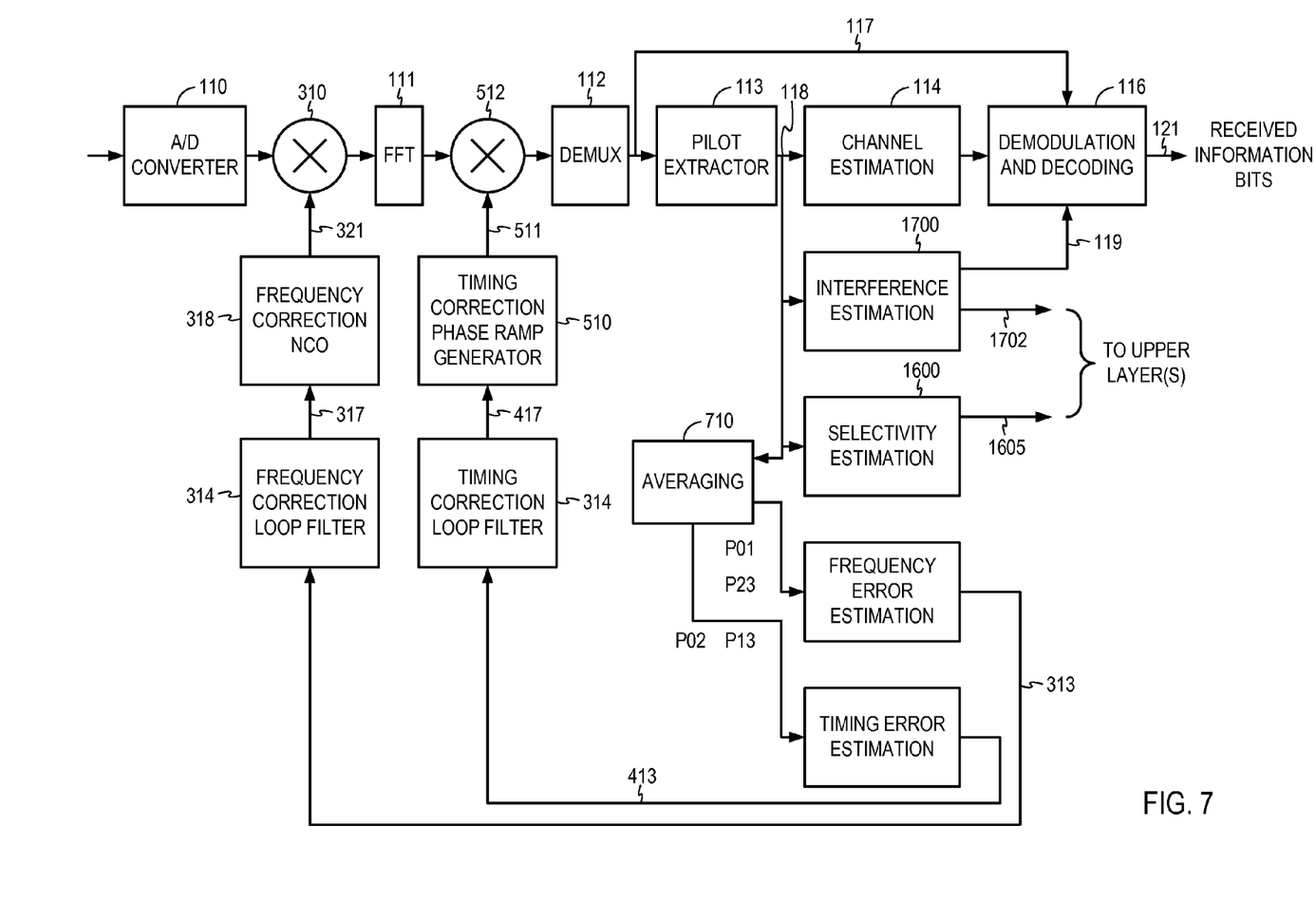
FIGS. 7-9 diagrammatically illustrate OFDM receivers that incorporate time and frequency offset correction, frequency selectivity estimation and interference estimation according to exemplary embodiments of the present work.

FIG. 7 diagrammatically illustrates an OFDM receiver in which time and frequency offset corrections, frequency selectivity estimation and interference estimation are all incorporated according to exemplary embodiments of the present work. In some embodiments, the receiver of FIG. 7 is used for a point-to-point link receiving a signal from a single transmitter. An example would be a mobile station that receives signals from one fixed base station. As shown, the receiver incorporates the frequency offset correction loop of FIG. 3, the timing offset correction loop of FIG. 5, the frequency selectivity estimation unit 1600 of FIG. 16 and the interference estimation unit 1700 of FIG. 17. An averaging unit 710 performs the averaging functions shown at 311 in FIGS. 3 and 411 in FIG. 4.

Figure 8:
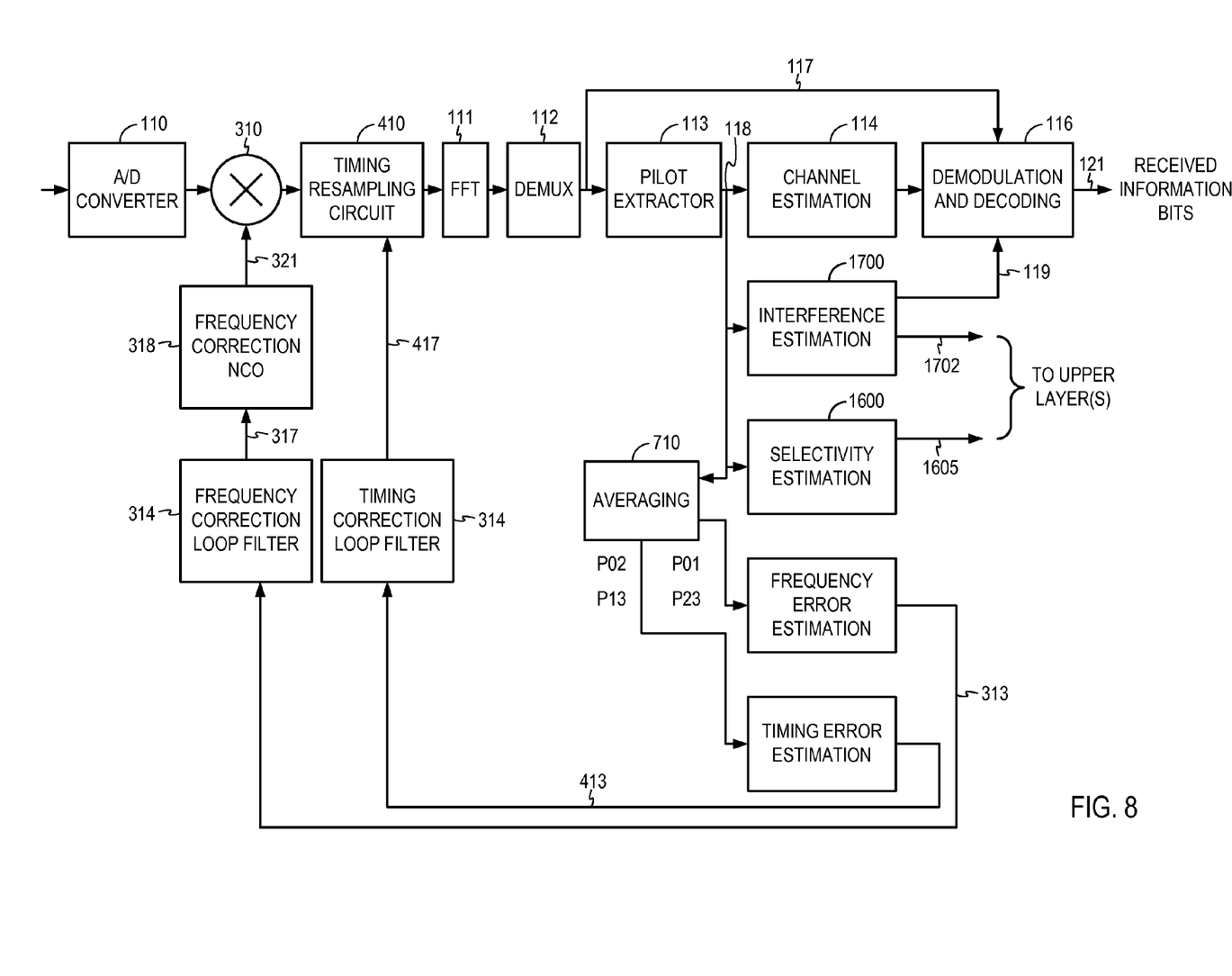

FIG. 8 diagrammatically illustrates an OFDM receiver in which time and frequency offset corrections, frequency selectivity estimation and interference estimation are all incorporated according to exemplary embodiments of the present work. In some embodiments, the receiver of FIG. 8 is used for a point-to-point link receiving a signal from a single transmitter. An example would be for a mobile station that receives signals from one fixed base station. As shown, the receiver incorporates the frequency offset correction loop of FIG. 3, the timing offset correction loop of FIG. 4, the frequency selectivity estimation unit 1600 of FIG. 16 and the interference estimation unit 1700 of FIG. 17. The averaging unit 710 performs the averaging functions shown at 311 in FIGS. 3 and 411 in FIG. 4.

Figure 9:
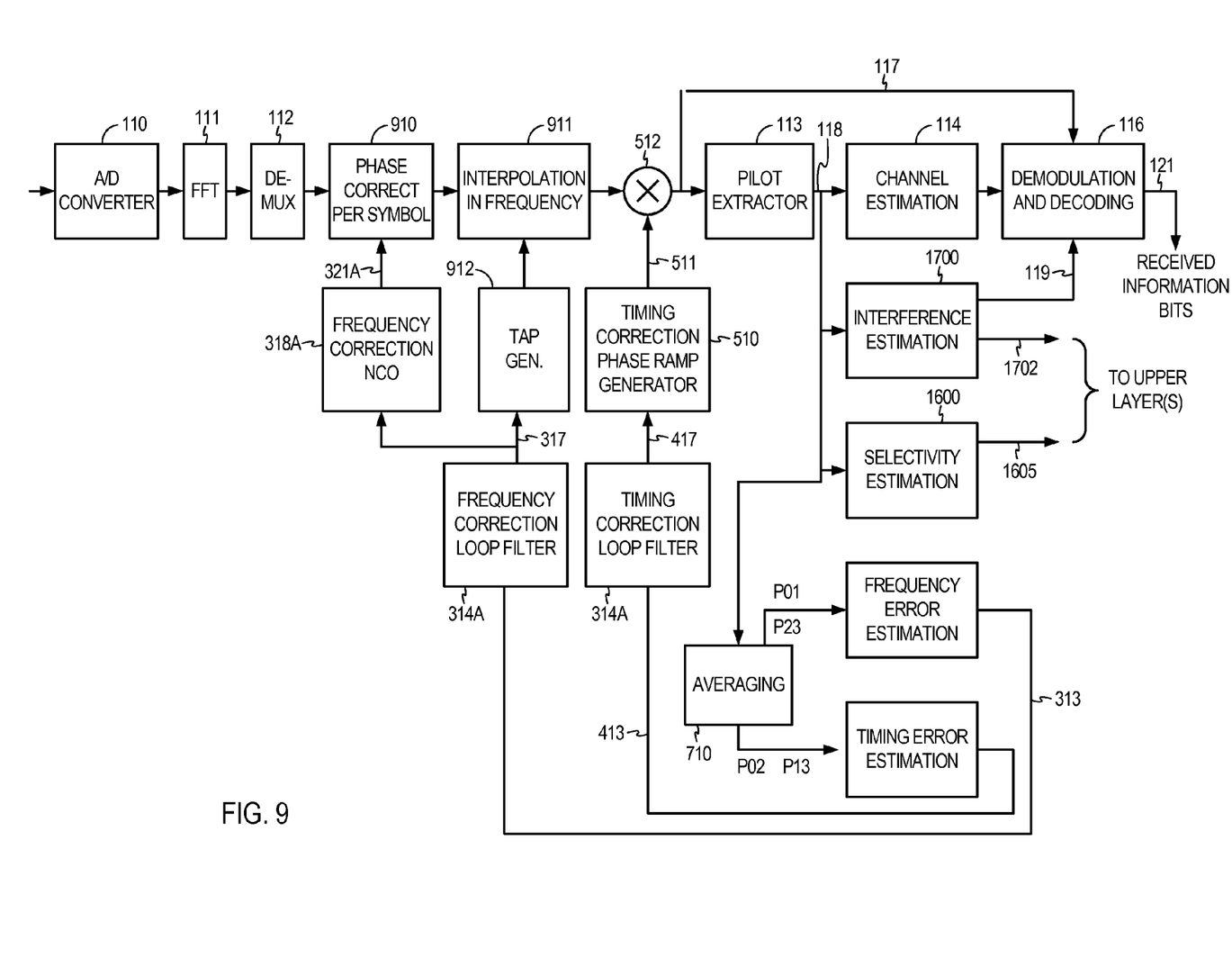

FIG. 9 diagrammatically illustrates an OFDM receiver in which time and frequency offset corrections, frequency selectivity estimation and interference estimation are all incorporated according to exemplary embodiments of the present work. In some embodiments, this receiver is a multiple-access receiver that receives signals from multiple transmitters. An example would be a fixed base station that receives signals from multiple mobile stations. The receiver of FIG. 9 is similar to those of FIGS. 7 and 8, but provides a two-part frequency offset correction, and performs both frequency and timing offset corrections downstream of the FFT unit 111 and the demux unit 112. In the aforementioned multiple-access environment, the FFT unit 11 operates upon a large frequency band which may contain multiple users operating at different frequencies and having different frequency and timing offsets. Accordingly, the frequency and timing offset corrections are performed after the FFT (111) and demux (112) operations because, if each user were to have a different frequency offset, then time samples resulting from different frequency compensations would have to be supplied to the FFT for each user, and a different FFT would have to be performed for each user. With the above-described arrangement of FIG. 9, only one FFT is necessary for all users.

The frequency error correction that is applied to the output of the demux unit 112 comprises two parts. For small frequency errors, little inter-tone interference is created, and the correction can effectively be done by a phase-correct-per-symbol unit 910 that multiplies all of the tones of the symbol by a single complex phasor at 321A. For larger errors, intertone interference may arise, and the value of a tone may have to be corrected by interpolation, using surrounding tones. This is done by an interpolation-in-frequency unit 911.

The phase-correct-per-symbol unit 910 performs correction over the entire symbol by multiplying all of the tones of that symbol by a single phasor at 321A. For this purpose, an NCO 318A provides the single phasor value per OFDM symbol. The structure of the NCO 318A is the same as that of the NCO 318 (see also FIGS. 3, 7 and 8), except the phase accumulator is clocked once per OFDM symbol, rather than once per time sample as in NCO 318.

Figure 10:
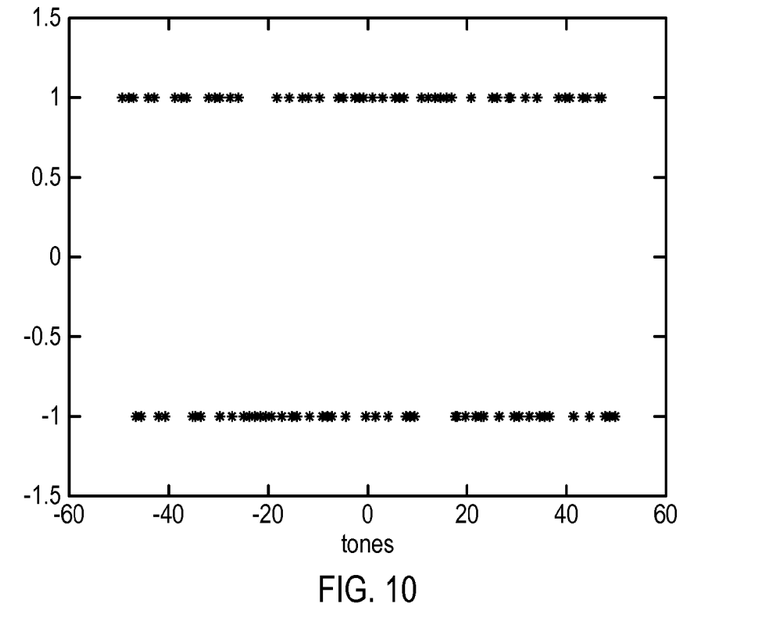
FIG. 10 graphically illustrates an example of tones transmitted in an OFDM system.
Figure 11:
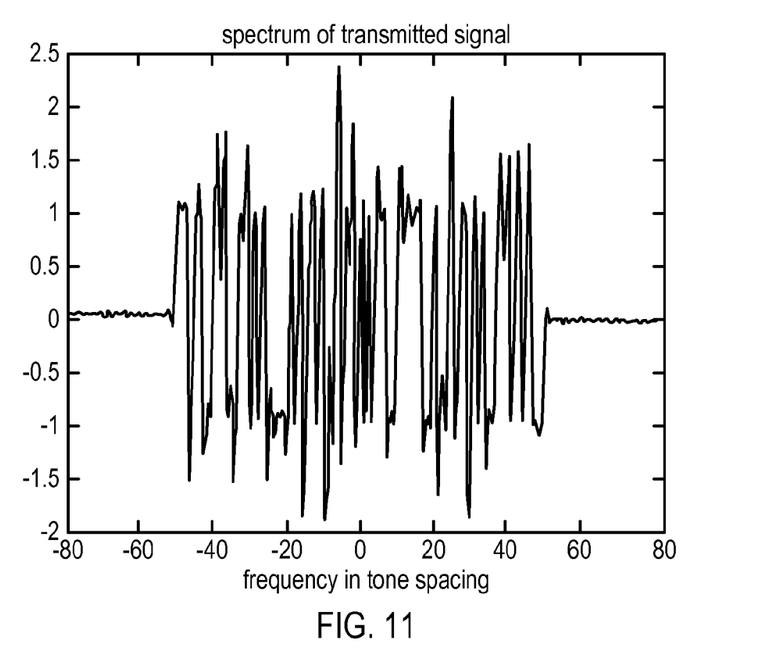
FIG. 11 graphically illustrates an example of the frequency spectrum of a transmitted signal in an OFDM system.
Figure 12:
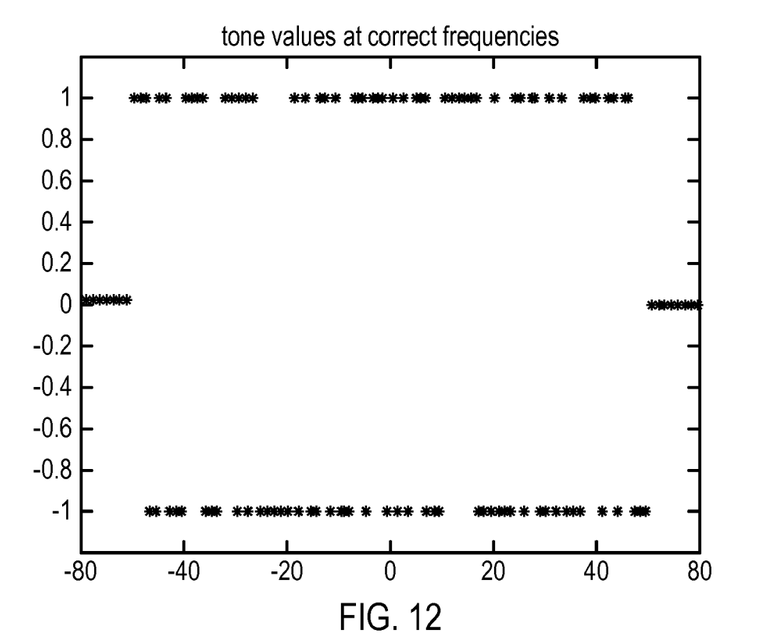
FIG. 12 graphically illustrates an example of tone values that are recovered from the transmitted tones of FIG. 10, when sampled by the receiver at correct frequencies.

As mentioned above, for larger frequency offsets, the value of a tone may need to be corrected by interpolation, using surrounding tones. Some embodiments use the following example interpolation procedure. Consider a set of transmitted tones of an OFDM symbol, in this case BPSK values of +1 and −1, as in FIG. 10. The transmitted spectrum is then a convolution of the tone values by a sinc function, as is well known in the art. The overall spectrum of the transmitted signal, including frequencies between the tones, is shown in FIG. 11. If there is no frequency error between the transmitter and receiver, the continuous spectrum waveform would be sampled at the correct points in frequency as shown in FIG. 12.

Figure 13:
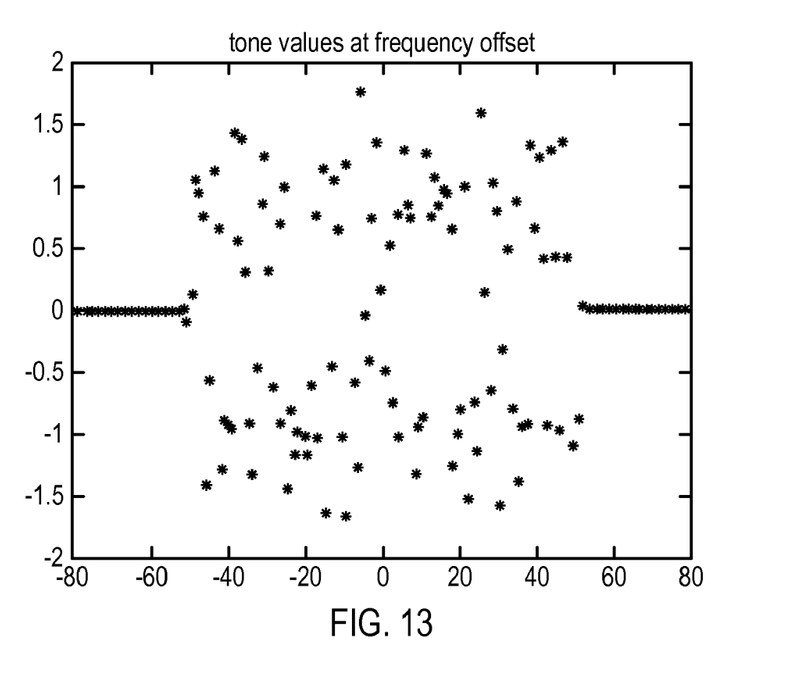
FIG. 13 graphically illustrates an example of corrupted tone values that are recovered from the transmitted tones of FIG. 10, when sampled by the receiver at frequencies that are offset from the correct frequencies.
Figure 14:
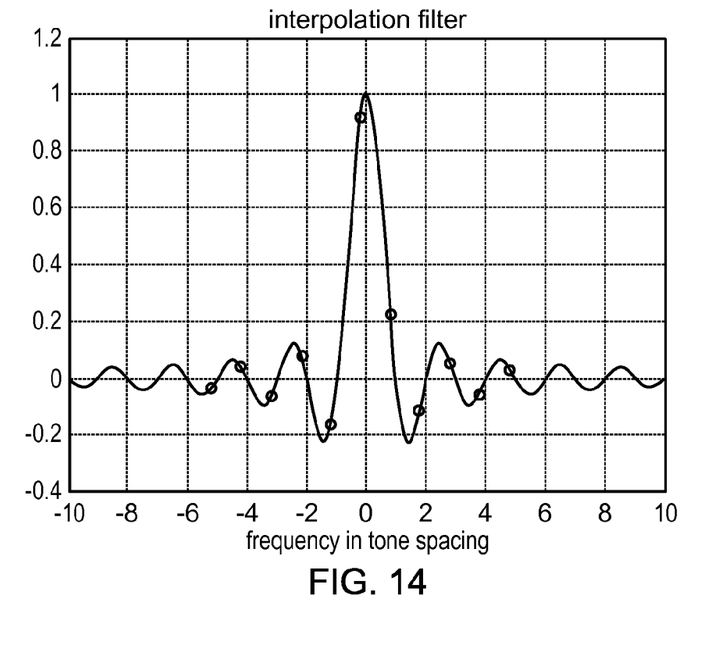
FIG. 14 graphically illustrates an example of an interpolation filter according to exemplary embodiments of the present work.

If however, there is a frequency error between the transmitter and receiver, the continuous spectrum waveform is sampled at offset points in frequency, yielding corrupted tone values, as shown in FIG. 13. In the example of FIG. 13, the receiver frequency offset is 0.2 tone spacings. For a given frequency offset, an interpolation filter can be designed, for example, using samples that are offset along an ideal sinc function. FIG. 14 shows a truncated filter example that uses eleven received tones to produce each interpolated tone. The filter taps (shown as circles on the sinc function) are, in this example, selected as sinc(k−0.2), where k runs from −5 to 5 (for a total of 11 taps), and the sinc function is defined as:

$$\text{sinc}(x)=1 \text{ for } x=0; \quad (6)$$

$$\text{sinc}(x)=\sin(\pi*x)/(\pi*x) \text{ for } x \neq 0. \quad (7)$$

Figure 15:
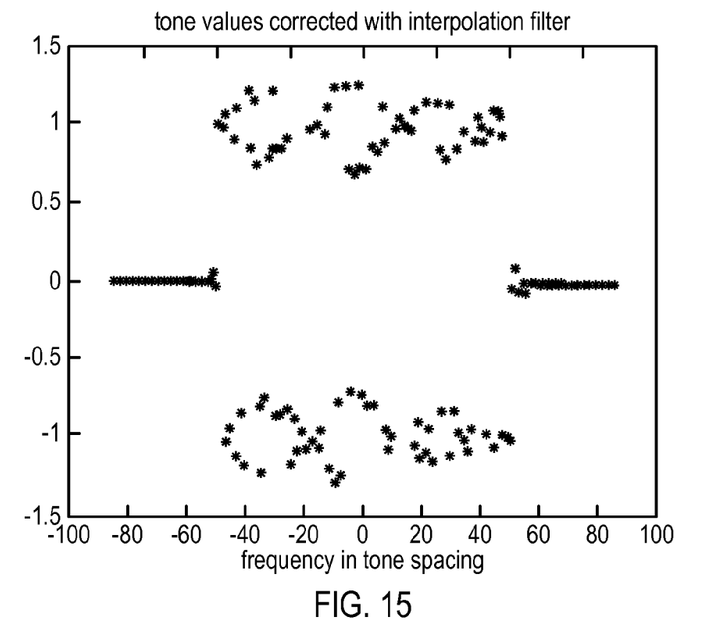
FIG. 15 graphically illustrates corrected tone values produced when the interpolation filter of FIG. 14 is applied to the corrupted tone values of FIG. 13.

Note that, in general, the taps would be selected as sinc(k−ϵ), where ϵ is the frequency offset (in units of tone spacing) provided at 317 by the frequency correction loop filter 314A. The taps are generated in response to the frequency offset ϵ by a tap generator 912, and are provided to the interpolation-in-frequency unit 911. Various embodiments use various numbers of taps and/or various interpolating functions other than the sinc function. The taps depend upon the current frequency error estimate ϵ provided at 317 by frequency correction loop filter 314A. The interpolation-in-frequency unit 911 is a filter whose taps are provided by the tap generator 912. The filter operation convolves the taps with the tone values received from the phase-correct-per-symbol unit 910 to provide corrected tone values as shown in FIG. 15. Each corrected tone value is the result of applying the filter operation to eleven frequency-adjacent tone values in the set of received tone values.

Note that the frequency error estimate is provided at 317 by the frequency correction loop filter 314A on a per-user basis, so the frequency correction loop filter 314A stores state information for each user, and may otherwise be the same as the loop filters 314 in FIGS. 3-5, 7 and 8. Note also that the timing error estimate is similarly provided at 417 on a per-user basis, so the timing correction loop filter 314A stores state information for each user, and may otherwise be the same as the loop filters 314 in FIGS. 3-5, 7 and 8.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present work.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use products that embody principles of the present work. Various modifications to these embodiments will be readily apparent to those skilled in the art, and the generic principles defined herein may be applied to other embodiments without departing from the spirit or scope of the disclosure. Thus, the present work is not intended to be limited to the embodiments shown herein but is to be accorded the widest scope consistent with the principles and novel features disclosed herein.

What is claimed is:

1. A wireless communication method, comprising:
receiving signaling that has been transmitted on an OFDM channel;
extracting pilot symbols from the signaling;
using the pilot symbols to produce first estimates of channel characteristics associated with transmission of the pilot symbols on the OFDM channel, wherein said first estimates include a low/early estimate associated with a lowest frequency and earliest time in an OFDM tile, a high/early estimate associated with a highest frequency and earliest time in the OFDM tile, a low/late estimate associated with a lowest frequency and latest time in the OFDM tile, and a high/late estimate associated with a highest frequency and latest time in the OFDM tile;
using the first estimates to produce a second estimate of one of a timing offset between transmission and reception of the signaling and a frequency offset between transmission and reception of the signaling, wherein said second estimate is one of (1) an estimate of a phase difference between a low average of said low/early estimate and said low/late estimate and a high average of said high/early estimate and said high/late estimate, and (2) an estimate of a phase difference between an early average of said low/early estimate and said high early estimate and a late average of said low/late estimate and said high/late estimate; and
adjusting, based on said second estimate, reception of subsequent signaling transmitted on the OFDM channel.

2. The method of claim 1, including using the first estimates to produce a third estimate of the other of said timing and frequency offsets, and adjusting, based on said third estimate, reception of subsequent signaling transmitted on the OFDM channel.

3. The method of claim 2, including using the first estimates to produce a fourth estimate of a frequency selectivity characteristic of the OFDM channel, and determining, based on said fourth estimate, whether to adjust a quantity of pilot symbols to be included in subsequent signaling transmitted on the OFDM channel.

4. The method of claim 1, including using the first estimates to produce a third estimate of a frequency selectivity characteristic of the OFDM channel, and determining, based on said third estimate, whether to adjust a quantity of pilot symbols to be included in subsequent signaling transmitted on the OFDM channel.

5. A wireless communication apparatus, comprising:
means for receiving signaling that has been transmitted on an OFDM channel;
means for extracting pilot symbols from the signaling and using the pilot symbols to produce first estimates of channel characteristics associated with transmission of the pilot symbols on the OFDM channel, wherein said first estimates include a low/early estimate associated with a lowest frequency and earliest time in an OFDM tile, a high/early estimate associated with a highest frequency and earliest time in the OFDM tile, a low/late estimate associated with a lowest frequency and latest time in the OFDM tile, and a high/late estimate associated with a highest frequency and latest time in the OFDM tile;
means for using the first estimates to produce a second estimate of one of a timing offset between transmission and reception of the signaling and a frequency offset between transmission and reception of the signaling, wherein said second estimate is one of (1) an estimate of a phase difference between a low average of said low/early estimate and said low/late estimate and a high average of said high/early estimate and said high/late estimate, and (2) an estimate of a phase difference between an early average of said low/early estimate and said high early estimate and a late average of said low/late estimate and said high/late estimate; and
means for adjusting, based on said second estimate, reception of subsequent signaling transmitted on the OFDM channel.

6. The apparatus of claim 5, including means for using the first estimates to produce a third estimate of the other of said timing and frequency offsets, and means for adjusting, based on said third estimate, reception of subsequent signaling transmitted on the OFDM channel.

7. The apparatus of claim 6, including means for using the first estimates to produce a fourth estimate of a frequency selectivity characteristic of the OFDM channel, and means for determining, based on said fourth estimate, whether to adjust a quantity of pilot symbols to be included in subsequent signaling transmitted on the OFDM channel.

8. The apparatus of claim 5, including means for using the first estimates to produce a third estimate of a frequency selectivity characteristic of the OFDM channel, and means for determining, based on said third estimate, whether to adjust a quantity of pilot symbols to be included in subsequent signaling transmitted on the OFDM channel.

9. A wireless communication apparatus, comprising:
an input for receiving signaling that has been transmitted on an OFDM channel;
a pilot extractor coupled to said input and configured to extracting pilot symbols from the signaling, said pilot extractor further configured to produce first estimates of channel characteristics associated with transmission of the pilot symbols on the OFDM channel, wherein said first estimates include a low/early estimate associated with a lowest frequency and earliest time in an OFDM tile, a high/early estimate associated with a highest frequency and earliest time in the OFDM tile, a low/late estimate associated with a lowest frequency and latest time in the OFDM tile, and a high/late estimate associated with a highest frequency and latest time in the OFDM tile; and
an offset correction loop coupled to said pilot extractor and configured to use the first estimates to produce a second estimate of one of a timing offset between transmission and reception of the signaling and a frequency offset between transmission and reception of the signaling, said offset correction loop further configured to adjust, based on said second estimate, reception of subsequent signaling transmitted on the OFDM channel, wherein said second estimate is one of (1) an estimate of a phase difference between a low average of said low/early estimate and said low/late estimate and a high average of said high/early estimate and said high/late estimate, and (2) an estimate of a phase difference between an early average of said low/early estimate and said high early estimate and a late average of said low/late estimate and said high/late estimate.

10. The apparatus of claim 9, including a further offset correction loop configured to use the first estimates to produce a third estimate of the other of said timing and frequency offsets, said further offset correction loop further configured to adjust, based on said third estimate, reception of subsequent signaling transmitted on the OFDM channel.

11. The apparatus of claim 10, including a frequency selectivity estimator configured to use the first estimates to produce a fourth estimate of a frequency selectivity characteristic of the OFDM channel, and a pilot format selector coupled to said frequency selectivity estimator and configured to determine, based on said fourth estimate, whether to adjust a quantity of pilot symbols to be included in subsequent signaling transmitted on the OFDM channel.

12. The apparatus of claim 9, including a frequency selectivity estimator configured to use the first estimates to produce a third estimate of a frequency selectivity characteristic of the OFDM channel, and a pilot format selector coupled to said frequency selectivity estimator and configured to determine, based on said third estimate, whether to adjust a quantity of pilot symbols to be included in subsequent signaling transmitted on the OFDM channel.

13. A computer program product that supports wireless communication, comprising:
a non-transitory computer-readable medium comprising:
code for causing at least one data processor to extract pilot symbols from signaling that has been transmitted on an OFDM channel, and to use the pilot symbols to produce first estimates of channel characteristics associated with transmission of the pilot symbols on the OFDM channel, wherein said first estimates include a low/early estimate associated with a lowest frequency and earliest time in an OFDM tile, a high/early estimate associated with a highest frequency and earliest time in the OFDM tile, a low/late estimate associated with a lowest frequency and latest time in the OFDM tile, and a high/late estimate associated with a highest frequency and latest time in the OFDM tile;
code for causing the at least one data processor to use the first estimates to produce a second estimate of one of a timing offset between transmission and reception of the signaling and a frequency offset between transmission and reception of the signaling, wherein said second estimate is one of (1) an estimate of a phase difference between a low average of said low/early estimate and said low/late estimate and a high average of said high/early estimate and said high/late estimate, and (2) an estimate of a phase difference between an early average of said low/early estimate and said high early estimate and a late average of said low/late estimate and said high/late estimate; and
code for causing the at least one data processor to adjust, based on said second estimate, reception of subsequent signaling transmitted on the OFDM channel.

14. The computer program product of claim 13, wherein the non-transitory computer-readable medium further comprises code for causing the at least one data processor to
use the first estimates to produce a third estimate of the other of said timing and frequency offsets, and
adjust, based on said third estimate, reception of subsequent signaling transmitted on the OFDM channel.

15. The computer program product of claim 14, wherein the non-transitory computer-readable medium further comprises code for causing the at least one data processor to
use the first estimates to produce a fourth estimate of a frequency selectivity characteristic of the OFDM channel, and
determine, based on said fourth estimate, whether to adjust a quantity of pilot symbols to be included in subsequent signaling transmitted on the OFDM channel.

16. The computer program product of claim 13, wherein the non-transitory computer-readable medium further comprises code for causing the at least one data processor to
use the first estimates to produce a third estimate of a frequency selectivity characteristic of the OFDM channel, and
determine, based on said third estimate, whether to adjust a quantity of pilot symbols to be included in subsequent signaling transmitted on the OFDM channel.

17. A wireless communication method, comprising:
receiving signaling that has been transmitted on an OFDM channel;
extracting pilot symbols from the signaling;
using the pilot symbols to produce first estimates of channel characteristics associated with transmission of the pilot symbols on the OFDM channel;
normalizing one of the first estimates to produce a second estimate of a frequency selectivity characteristic of the OFDM channel; and
determining, based on said second estimate, whether to adjust a quantity of pilot symbols to be included in subsequent signaling transmitted on the OFDM channel.

18. A wireless communication apparatus, comprising:
means for receiving signaling that has been transmitted on an OFDM channel;
means for extracting pilot symbols from the signaling;
means for using the pilot symbols to produce first estimates of channel characteristics associated with transmission of the pilot symbols on the OFDM channel;
means for normalizing one of the first estimates to produce a second estimate of a frequency selectivity characteristic of the OFDM channel; and
means for determining, based on said second estimate, whether to adjust a quantity of pilot symbols to be included in subsequent signaling transmitted on the OFDM channel.

19. A wireless communication apparatus, comprising:
an input for receiving signaling that has been transmitted on an OFDM channel;
a pilot extractor coupled to said input and configure to extract pilot symbols from the signaling, said pilot extractor further configured to use the pilot symbols to produce first estimates of OFDM channel characteristics associated with transmission of the pilot symbols on the OFDM channel;
a frequency selectivity estimator coupled to said pilot extractor and configured to use normalize one of the first estimates to produce a second estimate of a frequency selectivity characteristic of the OFDM channel; and
a pilot format selector coupled to said frequency selectivity estimator and configured to determine, based on said second estimate, whether to adjust a quantity of pilot symbols to be included in subsequent signaling transmitted on the OFDM channel.

20. A computer program product that supports wireless communication, comprising:
a non-transitory computer-readable medium comprising:
code for causing at least one data processor to extract pilot symbols from signaling that has been transmitted on an OFDM channel, and to use the pilot symbols to produce first estimates of channel characteristics associated with transmission of the pilot symbols on the OFDM channel;
code for causing the at least one data processor to normalize one of the first estimates to produce a second estimate of a frequency selectivity characteristic of the OFDM channel; and
code for causing the at least one data processor to determine, based on said second estimate, whether to adjust a quantity of pilot symbols to be included in subsequent signaling transmitted on the OFDM channel.

* * * * *